US010083099B2

(12) United States Patent
Blea et al.

(10) Patent No.: US 10,083,099 B2
(45) Date of Patent: Sep. 25, 2018

(54) AFTER SWAPPING FROM A FIRST STORAGE TO A SECOND STORAGE, MIRRORING DATA FROM THE SECOND STORAGE TO THE FIRST STORAGE FOR DATA IN THE FIRST STORAGE THAT EXPERIENCED DATA ERRORS

(71) Applicant: INTERNATIONAL BUSINESS MACHINES CORPORATION, Armonk, NY (US)

(72) Inventors: David R. Blea, Round Rock, TX (US); Gregory E. McBride, Vail, AZ (US); Carol S. Mellgren, Tucson, AZ (US); Tabor R. Powelson, Poughkeepsie, NY (US); William J. Rooney, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 74 days.

(21) Appl. No.: 15/187,388

(22) Filed: Jun. 20, 2016

(65) Prior Publication Data
US 2017/0364427 A1 Dec. 21, 2017

(51) Int. Cl.
*G06F 11/20* (2006.01)
*G06F 3/06* (2006.01)
(Continued)

(52) U.S. Cl.
CPC .......... *G06F 11/2033* (2013.01); *G06F 3/065* (2013.01); *G06F 3/067* (2013.01);
(Continued)

(58) Field of Classification Search
CPC .... G06F 11/20; G06F 11/2033; G06F 3/0638; G06F 3/0619; G06F 3/065; G06F 3/067
(Continued)

(56) References Cited

U.S. PATENT DOCUMENTS 7,085,956 B2 * 8/2006 Petersen ............... G06F 3/0601
714/6.31
7,117,386 B2 * 10/2006 LeCrone ............ G06F 11/2094
714/6.3
(Continued)

OTHER PUBLICATIONS

U.S. Appl. No. 15/187,369, filed Jun. 20, 2016 (18.637).
(Continued)

*Primary Examiner* — Kamini B Patel
(74) *Attorney, Agent, or Firm* — David W. Victor; Konrad Raynes Davda & Victor LLP

(57) ABSTRACT

Provided are a computer program product, system, and method for after swapping from a first storage to a second storage, mirroring data from the second storage to the first storage for data in the first storage that experienced data errors. A swap operation redirects host Input/Output (I/O) requests to data from the first server to the second server in response to a health condition at the first server. A determination is made of data errors with respect to data in the first storage that experienced data errors. The second server is instructed to mirror data in the second storage to the first server including data for the data in the first storage that experienced the data errors to store in the first storage in response to determining that the first server is available for the data mirroring operations.

19 Claims, 5 Drawing Sheets

(51) Int. Cl.
*G06F 12/08* (2016.01)
*G06F 11/16* (2006.01)

(52) U.S. Cl.
CPC .......... *G06F 3/0619* (2013.01); *G06F 3/0638* (2013.01); *G06F 11/1662* (2013.01); *G06F 12/08* (2013.01); *G06F 2201/805* (2013.01); *G06F 2212/60* (2013.01)

(58) Field of Classification Search
USPC ........................................................ 714/4.12
See application file for complete search history.

(56) References Cited

U.S. PATENT DOCUMENTS

| | | | |
|---|---|---|---|
| 7,152,078 B2 | 12/2006 | Yamagami | |
| 7,188,272 B2 * | 3/2007 | Bartfai | G06F 11/2058 714/6.31 |
| 7,793,148 B2 | 9/2010 | Beardsley et al. | |
| 8,010,758 B1 * | 8/2011 | Bezbaruah | G06F 11/2082 711/162 |
| 8,316,196 B1 * | 11/2012 | Mullis | G06F 11/2082 711/162 |
| 8,595,185 B2 | 11/2013 | Hayardeny et al. | |
| 8,799,602 B2 * | 8/2014 | Blea | G06F 11/2069 711/162 |
| 8,914,671 B2 * | 12/2014 | Rooney | G06F 11/2094 714/6.3 |
| 9,032,172 B2 * | 5/2015 | Johnson | G06F 3/0608 711/111 |
| 9,052,833 B2 | 6/2015 | Petersen et al. | |
| 9,092,449 B2 | 7/2015 | Brown et al. | |
| 9,703,619 B2 | 7/2017 | Andre et al. | |
| 2008/0172572 A1 * | 7/2008 | Beardsley | G06F 11/2069 714/6.12 |
| 2015/0088821 A1 | 3/2015 | Blea et al. | |
| 2015/0281015 A1 | 10/2015 | Griffith et al. | |
| 2015/0286545 A1 * | 10/2015 | Brown | G06F 11/2058 714/6.23 |
| 2015/0347245 A1 * | 12/2015 | Andre | G06F 11/203 714/6.3 |
| 2015/0347252 A1 | 12/2015 | Andre et al. | |
| 2015/0370659 A1 | 12/2015 | Pershin et al. | |
| 2016/0092322 A1 | 3/2016 | Nosov et al. | |
| 2016/0328303 A1 | 11/2016 | Brandner et al. | |
| 2017/0116071 A1 | 4/2017 | Arroyo et al. | |

OTHER PUBLICATIONS

List of IBM Patents or Patent Applications Treated as Related dated Jun. 20, 2016, pp. 2.

W. Bauer, et al., "IBM DS8000 and z/OS Basic HyperSwap", IBM Corporation, Redpaper, 2008, pp. 38.

K. Orlando, et al., "Introducing and Implementing IBM FlashSystem V9000", IBM Corporation, Redbooks, Document SG24-8273-01, Oct. 2015, pp. 598.

J. Tate, et al., "IBM Storwize V7000, Spectrum Virtualize, HyperSwap, and VMware Implementation", IBM Corporation, Redbooks, Document SG24-8317-00, Nov. 2015, pp. 176.

Response dated Feb. 15, 2018, pp. 12, to Office Action dated Nov. 15, 2017, pp. 23, for U.S. Appl. No. 15/187,369, filed Jun. 20, 2016 (18.637).

Notice of Allowance dated May 9, 2018, pp. 12, for U.S. Appl. No. 15/187,369, filed Jun. 20, 2016 (18.637).

Office Action dated Nov. 15, 2017, pp. 23, for U.S. Appl. No. 15/187,369, filed Jun. 20, 2016 (18.637).

* cited by examiner

Replication Information

Health Condition Entry

Health Condition Message

AFTER SWAPPING FROM A FIRST STORAGE TO A SECOND STORAGE, MIRRORING DATA FROM THE SECOND STORAGE TO THE FIRST STORAGE FOR DATA IN THE FIRST STORAGE THAT EXPERIENCED DATA ERRORS

BACKGROUND OF THE INVENTION

1. Field of the Invention

The present invention relates to a computer program product, system, and method for after swapping from a first storage to a second storage, mirroring data from the second storage to the first storage for data in the first storage that experienced data errors.

2. Description of the Related Art

In a storage environment, primary and secondary storage servers may maintain mirror copy relationships, where a primary volume in a mirror copy relationship comprises the storage or volumes from which data is physically copied to a secondary volume. Swapping programs, such as International Business Machine Corporation's ("IBM") Hyper-Swap® which is a function in the z/OS® operating system, provides continuous availability for disk failures by maintaining the mirror copy relationships to provide synchronous copies of all primary disk volumes on one or more primary storage systems to one or more target (or secondary) storage systems. (HyperSwap and z/OS are registered trademarks of IBM in countries throughout the world). When a disk failure is detected, code in the operating system identifies Hyper-Swap managed volumes and instead of failing the I/O request, HyperSwap switches (or swaps) information in internal control blocks so that the I/O request is driven against the secondary volume of the mirror copy relationship. Since the secondary volume is an identical copy of the primary volume prior to the failure, the I/O request will succeed with no impact to the program issuing the I/O request, which could be an application program or part of the operating system. This therefore masks the disk failure from the program and avoids an application and/or system outage. (IBM, HyperSwap, and z/OS are registered trademarks of IBM in many countries).

Storage controllers may raise signals to alert the host system of error conditions, referred to as storage controller health messages. These health messages can be raised during controller recovery actions, internal control block rebuild actions or severe error conditions. These types of conditions may indicate that the controller either cannot service Input/Output (I/O) requests or will be delayed in servicing I/O requests. For temporary conditions, additional storage controller health messages may be raised to signal the condition being resolved.

When HyperSwap is enabled and certain types of storage controller health messages are received indicating health conditions on the primary server, HyperSwap may react to the health message as a swap trigger and initiate a Hyper-Swap to redirect I/O requests to the secondary system and break a synchronous copy relationship between the primary and secondary servers so data is no longer mirrored from the primary server having the health condition to the secondary server, now operating as the primary server as a result of the HyperSwap.

There is a need in the art for improved techniques for managing health messages for servers in a mirror copy relationship with swapping capabilities.

SUMMARY

Provided are a computer program product, system, and method for after swapping from a first storage to a second storage, mirroring data from the second storage to the first storage for data in the first storage that experienced data errors. A swap operation redirects host Input/Output (I/O) requests to data from the first server to the second server in response to a health condition at the first server, wherein after the swap operation, the host I/O requests are directed to the second server. A determination is made that the first server is available for data mirroring operations and of data errors with respect to data in the first storage that experienced data errors. The second server is instructed to mirror data in the second storage to the first server including data for the data in the first storage that experienced the data errors to store in the first storage in response to determining that the first server is available for the data mirroring operations.

DETAILED DESCRIPTION

In current storage environments, the operator needs to ensure that the errors that resulted in the health condition messages triggering the swap, such as a HyperSwap, are resolved. If the operator is satisfied the errors have been sufficiently resolved, the operator may initiate replication from the new primary server to the secondary server (which was the previous primary server that had the failure). Hyper-Swap from the new primary server to the secondary server cannot be enabled until the data at the new primary server/storage is mirrored to the secondary server/storage and reaches a full duplex state.

Described embodiments provide techniques for a host to automatically manage health conditions at a primary server to determine when to initiate the swap. After the swap when the host I/O access has been redirected from a first server, operating as a primary server, to a second server, previously operating as the secondary server, the host monitors health conditions at the first server. Upon the health conditions being resolved, the host may automatically initiate mirror copy operations to copy data from a second storage at the second server, operating as the new primary server, to the first server, now operating as the secondary server, to store in a first storage at the first server.

Further, if, as a result of the one or more health conditions, there are data errors in the first storage, such as data errors resulting from pinned data, then the host may instruct the second server to mirror data in the second storage to the first server in response to determining that the first server is available for the data mirroring operations. The data the second server mirrors back to the first server may include data for the data in the first storage that experienced the data errors resulting from pinned data.

In this way, with the described embodiments, by automatically re-initiating mirror copy operations from the storage at the new primary server to the current secondary server (previous primary server) after health conditions are resolved, the new secondary storage may reach full duplex state after health conditions are resolved and then be available for a further swap operation from the new primary server back to the new secondary server.

Figure 1:
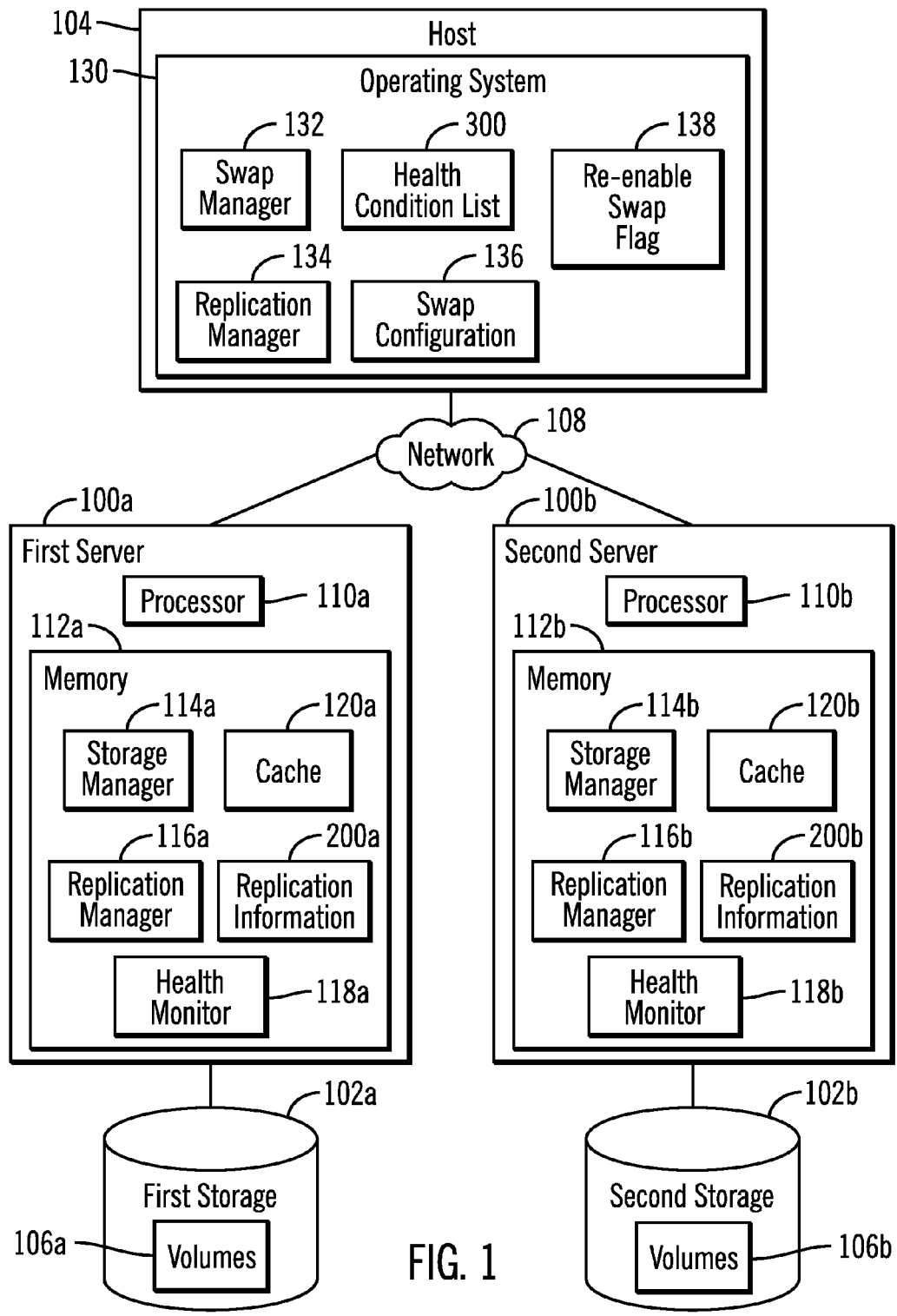
FIG. 1 illustrates an embodiment of a storage environment.

FIG. 1 illustrates a storage environment having a first server 100a and a second server 100b that manage a first storage 102a and a second storage 102b, respectively. A host 104 may access volumes 106a and 106b in the first storage 102a and the second storage 102b, respectively, over a network 108. The primary server 100a and the secondary server 100b may also communicate over the network 108 or a separate network or interface. The volumes 106a, 106b may comprise a Logical Unit Number (LUN), Logical Subsystem (LSS), or any grouping of tracks, where a track may comprise a block, track or any data unit.

Each server 100a, 100b includes a processor 110a, 110b, comprising one or more processor devices, and a memory 112a, 112b. Each memory 112a, 112b includes a storage manager 114a, 114b to manage read and write access to the respective storage 102a, 102b from the host 104; a replication manager 116a, 116b to replicate data between the servers 100a, 100b; replication information 200a, 200b on volumes 106a, 106b subject to mirror copy operations; a health monitor 118a, 118b to monitor the health of components in the servers 100a, 100b and generate health message indicating the start or end of a health condition with respect to hardware or components in the servers 100a, 100b, respectively; and a cache 120a, 120b to cache read and write data with respect to the volumes 106a, 106b in the respective primary 102a and secondary 102b storages.

The host 104 includes an operating system 130 having a swap manager 132 to manage a swap from one of the servers 102a, 102b acting as a primary server, to the other server 100b, 100a, respectively, acting as the secondary server; a replication manager 134 to manage replication or mirror copy operations between the servers 100a, 100b; a swap configuration 136 having control information to switch control from the primary server 100a, 100b to the secondary server 100b, 100a, respectively; a health condition list 300 indicating health conditions determined at the servers 100a, 100b; and a re-enable swap flag 138 indicating whether to re-enable swap after resolving health conditions at a previous primary server that resulted in a swap operation. Re-enablement of the swap would allow the new primary server to swap back to the previous primary server whose health conditions previously triggered the swap.

The host 104 may direct Input/Output (I/O) requests to the first server 100a, functioning as a primary server, to access tracks from the first storage 102a. In such case, the first replication manager 116a would initially copy all volumes 106a being replicated to volumes 106b in the second storage 102b, functioning as a secondary storage, and then upon receiving an update to a volume 106a, transfer that updated track to the second server 100b to store in the second storage 102b. In the event the host 104 detects that the one or more of the volumes 106a are unavailable, due to a planned or unplanned event, the host swap manager 132 initiates a swap from one or more of the volumes 106a, including those that are now unavailable, to the corresponding volumes 106b managed by the secondary server 100b, so that all host 104 I/O access is redirected to the secondary server 100b and secondary volumes 106b that are swapped. Either server 100a, 100b may operate as the primary server to which host 104 I/O access is directed and the secondary server to which data is mirrored.

In one embodiment, when detecting unavailability of a subset of the volumes 106a, i.e., less than all of the volumes 106a, only the unavailable volumes 106a may be subject to a swap, where those primary volumes 106a still available may not be swapped. In this way, I/O requests can continue to the available volumes 106a and be redirected for the unavailable volumes. In an alternative embodiment, all of the volumes 106a may be swapped to the secondary volumes 106b even if just a subset of the volumes 106a are unavailable.

In certain embodiments, the host operating system 130 may comprise an operating system such as z Systems Operating System (z/OS®) from International Business Machines Corporation ("IBM") or other operating systems known in the art. (z/OS is a registered trademark of IBM throughout the world). The host swap manager 132 may comprise IBM's HyperSwap® program or other similar swapping programs by other vendors. The storage servers 100a and 100b may be comprised of an enterprise storage server suitable for managing access to attached or integrated storage devices, such as the IBM DS8000® storage system. (z/OS, HYPERSWAP, and DS8000 are registered trademarks of IBM in countries throughout the world).

A swap operation from one server to another comprises any operation which redirects host 104 access from one server and storage pair to the other server and storage pair to provide hosts 104 continual access to data, whether it be accessed from the primary storage 102a or the secondary storage 102b. In this way, the swap operation allows for continued, minimally interrupted access to storage.

The network 108 may comprise a Storage Area Network (SAN), Wide Area Network (WAN), Local Area Network (LAN), the Internet, and Intranet, a wireless network, wired network, etc. Additionally, the servers 100a, 100b may communicate over another interface, such as a bus or other network, including a Peripheral Component Interconnect Express (PCIe) bus.

The storages 102a, 102b may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes 106a, 106b may further be configured from an array of devices, such as Just a Bunch of Disks (JBOD), Direct Access Storage Device (DASD), Redundant Array of Independent Disks (RAID) array, virtualization device, etc. Further, the storages 102a, 102b may comprise heterogeneous storage devices from different vendors and different types of storage devices, such as a first type of storage devices, e.g., hard disk drives, that have a slower data transfer rate than a second type of storage devices, e.g., SSDs.

Figure 2:
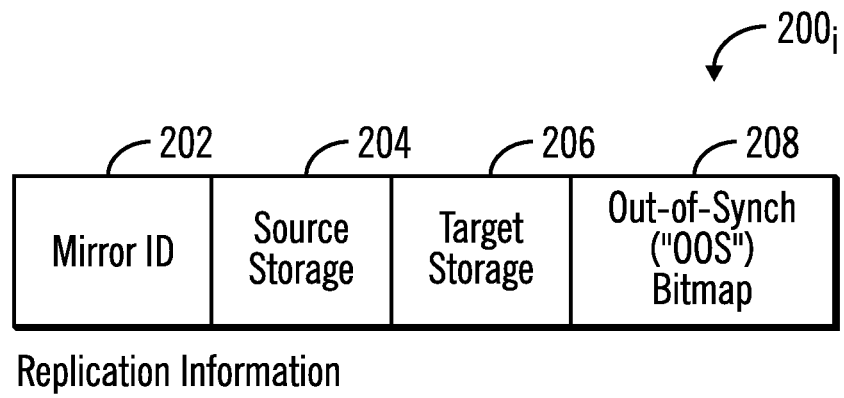
FIG. 2 illustrates an embodiment of replication information for a mirror copy relationship.

FIG. 2 illustrates an embodiment of an instance of replication information $200_i$ maintained in the servers 100a, 100b and host 104 to manage mirror copy/replication operations, and includes a mirror identifier (ID) 202; a source storage 204 comprising one or more volumes in the source storage being copied to a target storage 206, comprising one or more volumes to which data is replicated/mirrored; and an out-of-synch ("OOS") bitmap 208, or other data structure, indicating tracks that need to be copied from the source storage 204 to the target storage 206 as part of mirror copy operations. In certain embodiments, the OOS bitmap 208 may be maintained at the servers 100a and 100b, but not the host 104. For an initial copy operation, all the tracks in the source storage 204 may be indicated as needing to be mirrored in the OOS bitmap 208. Following the initial copy, modified data is indicated in the OOS bitmap 208 as needing to be mirrored. Once the data is mirrored or copied to the target storage 206, then the bit or information in the OOS bitmap 208 is updated to indicate that the corresponding track does not need to be mirror copied. In synchronous mirroring operations, once full duplex is achieved, further changes are not indicated in the OOS bitmap 208 because such future changes are copied immediately to the secondary server 100b and before the I/O request is completed.

Figure 3:
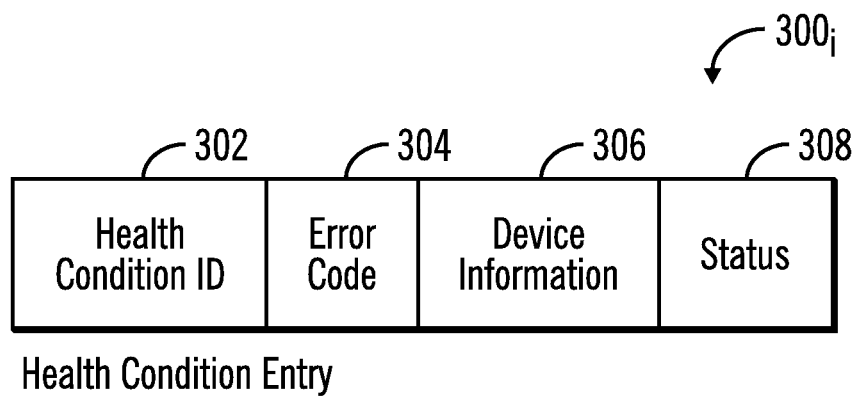
FIG. 3 illustrates an embodiment of a health condition entry in a health condition list.

FIG. 3 illustrates an embodiment of a health condition entry $300_i$ generated by the health monitors 118a, 118b in the servers 100a, 100b that is included in the health condition list 300, including: a health condition identifier (ID) 302 identifying the entry; an error code 304 or information indicating a type of condition or error, a scope of the condition, such as a failure of a particular component in the device, a scope of the lost volume, e.g., Logical Subsystem (LSS) or entire physical controller, severity level, etc.; device information 306 indicating the component in the first server 100a that experienced the error, such as a rank ID, device adaptor ID, interface ID for a host adaptor that encountered the condition, volume, LSS, entire server, etc.; and a status 308 of the health condition, such as open or resolved. The health condition may comprise a hardware error in the primary server 100a, 100b or storage 102a, 102b that is resolved by fixing or replacing the hardware, a hardware or data error in the primary storage 1002, 102b, an error in a device or host adaptor in the primary server 100a, 100b, etc.

For certain types of errors, the error code 304 may indicate pinned data at the storage 102a, 102b and the device information 306 may indicate the tracks that have pinned data, which comprises data that may be lost or corrupted in the cache 120a, 120b.

Figure 4:
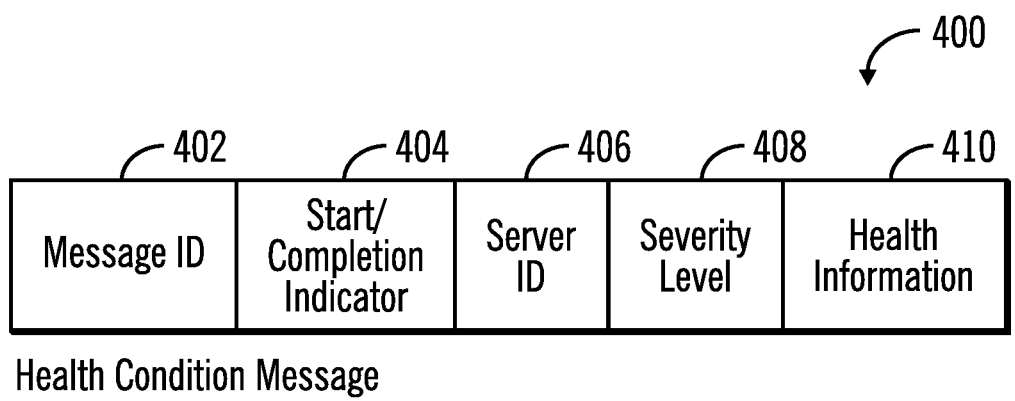
FIG. 4 illustrates an embodiment of a health condition message.

FIG. 4 illustrates an embodiment of a health condition message 400 generated by the health monitors 118a, 118b in the servers 100a, 100b upon detecting an error or condition in a component of the servers 100a, 100b and/or storages 102a, 102b, and sent to host 104 for processing. The message 400 may include: a message identifier (ID) 402; a start/completion indicator 404 indicating whether the health condition has been detected and is unresolved or has completed and is resolved; a server ID 406 identifying the server 100a, 100b that originated the message 400; a severity level 408 of the health condition, such as acute, minor, sever, etc.; and health information 410, such as the error code 304, device information 306, and other information about the health condition.

The severity level 408 may be used to determine whether to initiate a swap operation. For instance, an acute message which may trigger a swap, may be sent for reasons such as the server 100a, 100b is going through a recovery procedure, during which data is unavailable to be read and/or written, or it may indicate a data loss condition. In the case of a recovery procedure, an acute condition may be indicated when the health condition is a non-retryable or retryable software (firmware) error requiring a recovery procedure, such as restarting the failed component for a retryable error, that will interrupt host I/O access to the primary server and take more time to complete than the time required for the swap operation, such that data would be inaccessible for less time if the swap was performed. Once the recovery procedure is complete with respect to one or more health conditions, then the server health monitor 118a, 118ba generates one or more complete health condition messages 400 providing information on a health condition that has been resolved. The host swap manager 132 or other host 104 component may use information on resolved health conditions to determine to establish mirror copying from a server 100b to which a swap occurred back to the server 100a which experienced the swap, which restores protection from a potential subsequent failuver.

Figure 5A:
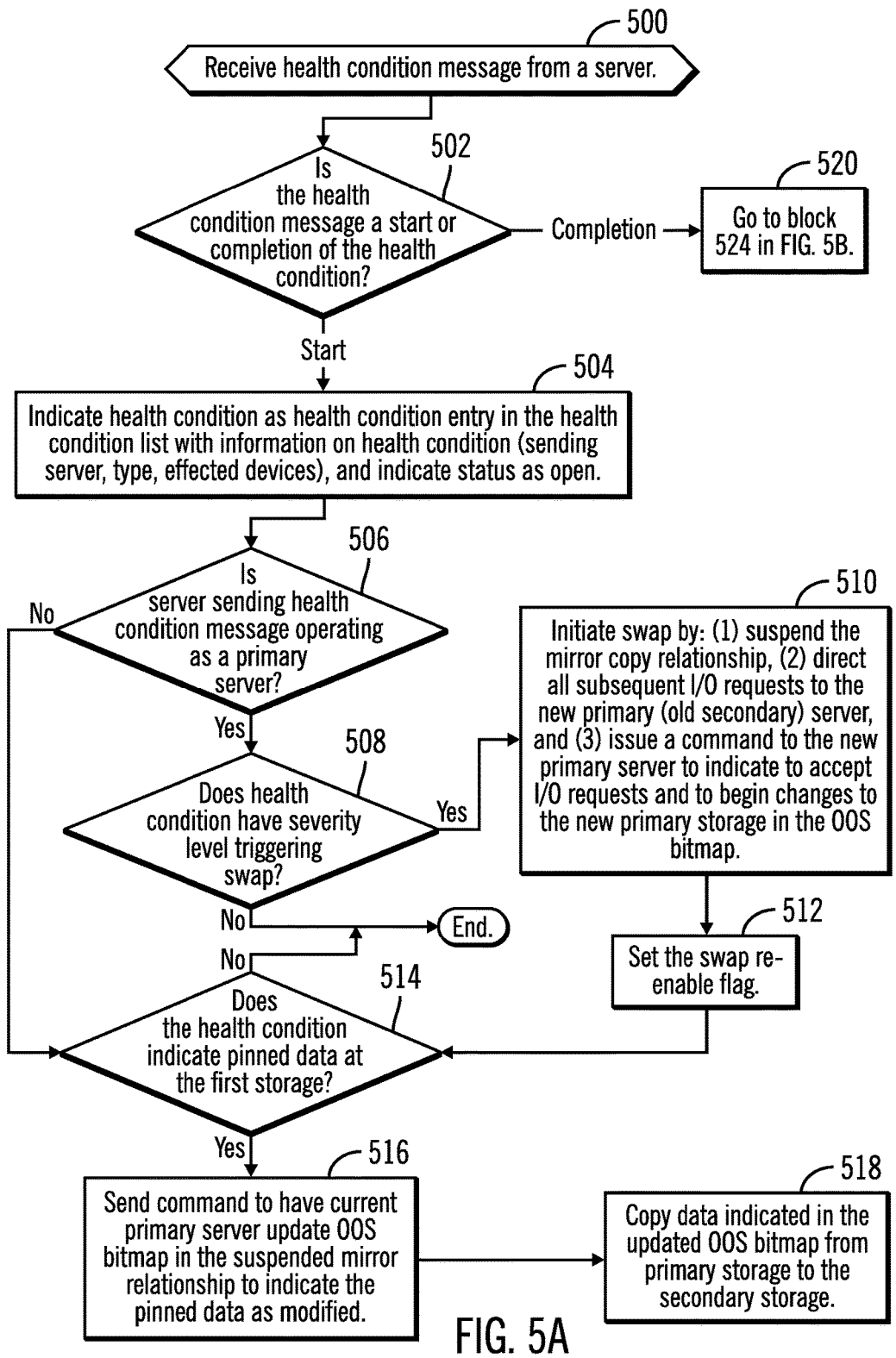
FIGS. 5*a* and 5*b* illustrate an embodiment of operations to process health conditions and perform a swap operation.
Figure 5B:
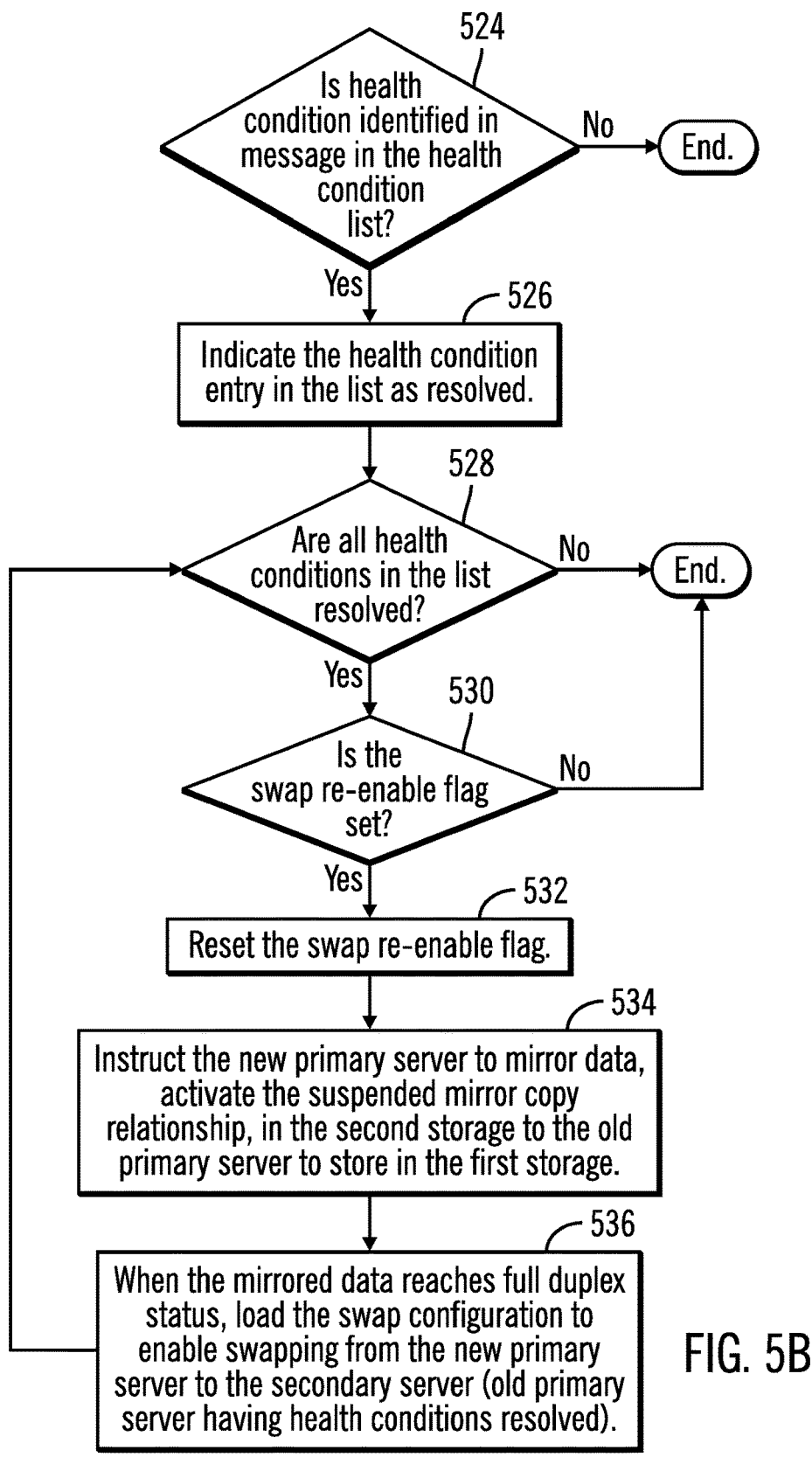

FIGS. 5a and 5b illustrate an embodiment of operations performed by the host 104, such as in the swap manager 132 and replication manager 134, to manage health conditions at the servers 100a, 100b, such as by receiving health condition messages 400. Control begins with the swap manager 132 receiving (at block 500) a health condition message 400 from a server, e.g., 100a. In alternative embodiments, the swap manager 132 may determine health conditions by querying the servers 100a, 100b directly. If (at block 502) the health condition message 400 is a start condition, as indicated in start/completion indicator field 404, then the swap manager 132 indicates (at block 504) the health condition as a health condition entry $300_i$ in the health condition list 300, such as by including, in the new health condition entry $300_i$, the error code 304 and device information 306, which may be indicated in the severity level 408 and health information 410 of the message 400, and indicate the status 308 as open or unresolved.

If (at block 506) the server 100a sending the message is operating as a primary server, mirroring data to a secondary server 100b, and the storage 102a remains swap capable, then the swap manager 132 determines (at block 508) whether the health condition indicated in the received message 400 has a severity level 408 indicating to swap. The severity level 408 indicating to swap may be set when the expected time of the recovery procedure exceeds the time to perform the swap operation to the secondary server 100b, 100a or when fixing or replacing the hardware at the server 100a and/or storage 102a is required. If (at block 508) the severity level 408 indicates acute, or severe enough to trigger a swap, then the swap manager 132 initiates (at block 510) a swap by: (1) suspending the mirror copy relationship $200_i$ to prevent further access to the old primary server 100a, (2) directing all subsequent I/O requests from the host 104 to the new primary server 100b, and (3) issue commands to the new primary server 100b to accept I/O requests and to begin changes to the new primary storage 102b in the 00S bitmap 208 in new suspended relationship information $200_i$ maintained at the new primary server 100b to mirror back to the new secondary server 100a. Either server 100a or 100b may operate as the primary or secondary server. The primary server comprises the server to which host 104 I/O requests are directed and updates to the primary storage are mirrored to the secondary server to store. The swap manager 132 further sets (at block 512) a re-enable swap flag 138 to indicate to swap manager 132 that the reason for the swap was such that if all health condition entries 300i have been resolved, then automatic restarting of mirroring from the new primary storage 102b to the new secondary storage 102a is permitted. If (at block 508) the health condition does not have a severity level 408 indicating acute or sever enough to trigger a swap, then control ends.

After initiating the swap (at blocks 510-512) or if (from the no branch at block 506) the server 100a sending the message 400 is not operating as a primary server, i.e., is a secondary server, then a determination is made (at block 514), such as in the health condition entries 300i, health information 410, as to whether there is pinned data in the storage 102a that occurred with the health condition. If so, the swap manager 132 sends (at block 516) a command to have the current primary server 100a or 100b update the OOS bitmap 208 in the suspended mirror relationship 200 to indicate the pinned data as modified.

Updating the OOS bitmap 208 to indicate the pinned data as modified will cause the current primary server to mirror the pinned data in the primary storage to the current secondary storage to overwrite the corrupted data at the current secondary storage. Thus, data errors resulting in pinned data may be experienced and indicated with the health condition that resulted in the swap or one or more additional health conditions occurring at the failed primary server 100a after the swap and before the health conditions are resolved. The primary server copies (at block 518) in the updated OOS bitmap 208 from the primary storage to the secondary storage.

In an alternative embodiment, the server 100a (either primary or secondary) experiencing the pinned data may update its OOS bitmap 208 for the terminated mirror copy relationship $200_i$ to indicate the pinned data as modified. Subsequently, when the mirror copy relationship $200_j$ is activated to mirror from the current primary storage (which could be an old secondary server/storage) to the current secondary storage (which could be an old primary server/storage), then the OOS bitmap 208 at the current secondary server is merged, e.g., OR'd, with the OOS bitmap 208 in the current primary server to mark the tracks in the OOS bitmap 208 corresponding to the pinned data as modified so they are mirrored over when the current primary server mirrors data to the recovered current secondary server. The OR operation sets the OOS bitmap 208 to indicate to mirror the data if either or both bits in the OOS bitmaps 208 for the current primary and secondary servers indicate to copy, i.e., are "on".

If (at block 502) the health condition message 400 indicates a resolution/completion of a health condition in start/completion indicator field 404, then control proceeds (at block 520) to block 524 in FIG. 5b to determine whether the health condition identified in the message 400 is in the health condition list 300. If so, then the swap manager 132 indicates (at block 526) the health condition entry $300_i$ for the health condition as resolved in status field 308. If (at block 528) all health conditions in the list 300 for the recovering server 100a are resolved, then a determination is made (at block 530) whether the re-enable swap flag 138 is set. If (at block 530) the re-enable swap flag 138 is set, then the re-enable swap flag 138 is reset (at block 532) and the swap manager 132 instructs (at block 534) the new primary server 100b to mirror data, such as activate the suspended mirror copy relationship $200_j$, in the second storage 102b to the old primary server 100a to store in the first storage 102a. At this point, if there was pinned data indicated in the OOS bitmap 208 of the activated mirror copy relationship $200_j$, then that would be copied over from the second storage 102b to the first storage 102a to overwrite the pinned data with valid data. The data at the first storage 102a would be indicated as unpinned in response to the data mirroring operations overwriting the data in the first storage 102a experiencing the data errors with data mirrored from the second storage 102b. When the mirrored data between the new primary storage 102b and the recovered secondary storage 102b reaches full duplex status, i.e., all modified data is mirrored, then the swap manager 132 loads (at block 536) the swap configuration 136 to enable swapping from the new primary server 100b to the secondary server 100a (old primary server having health conditions resolved). From block 536 control proceeds back to block 528 in the event additional health conditions have been detected, such that there are new health conditions that are open.

In certain embodiments, the health condition list may include just the initial health condition that triggered the swap. Alternatively, if there are health conditions detected at the old primary server after the swap, the health condition list 300 may include additional health conditions, all of which may need to be resolved before restarting the mirroring back from the new primary storage to the old primary server that triggered the swap. In one embodiment, before mirroring is initiated from the new primary server back to the failed server, all health conditions on the list for the old primary server that went through recovery must be resolved. In an alternative embodiment, only acute health conditions independently capable of triggering a swap need to be resolved before mirroring from the new primary server back to the old primary server that resulted in the swap.

With the described embodiments, the host 104 manages health conditions at the primary server that triggered the swap to determine when to initiate mirror copying from the new primary server back to the failed old primary server, so that previous primary server may function as a secondary server available for an additional swap operation if needed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
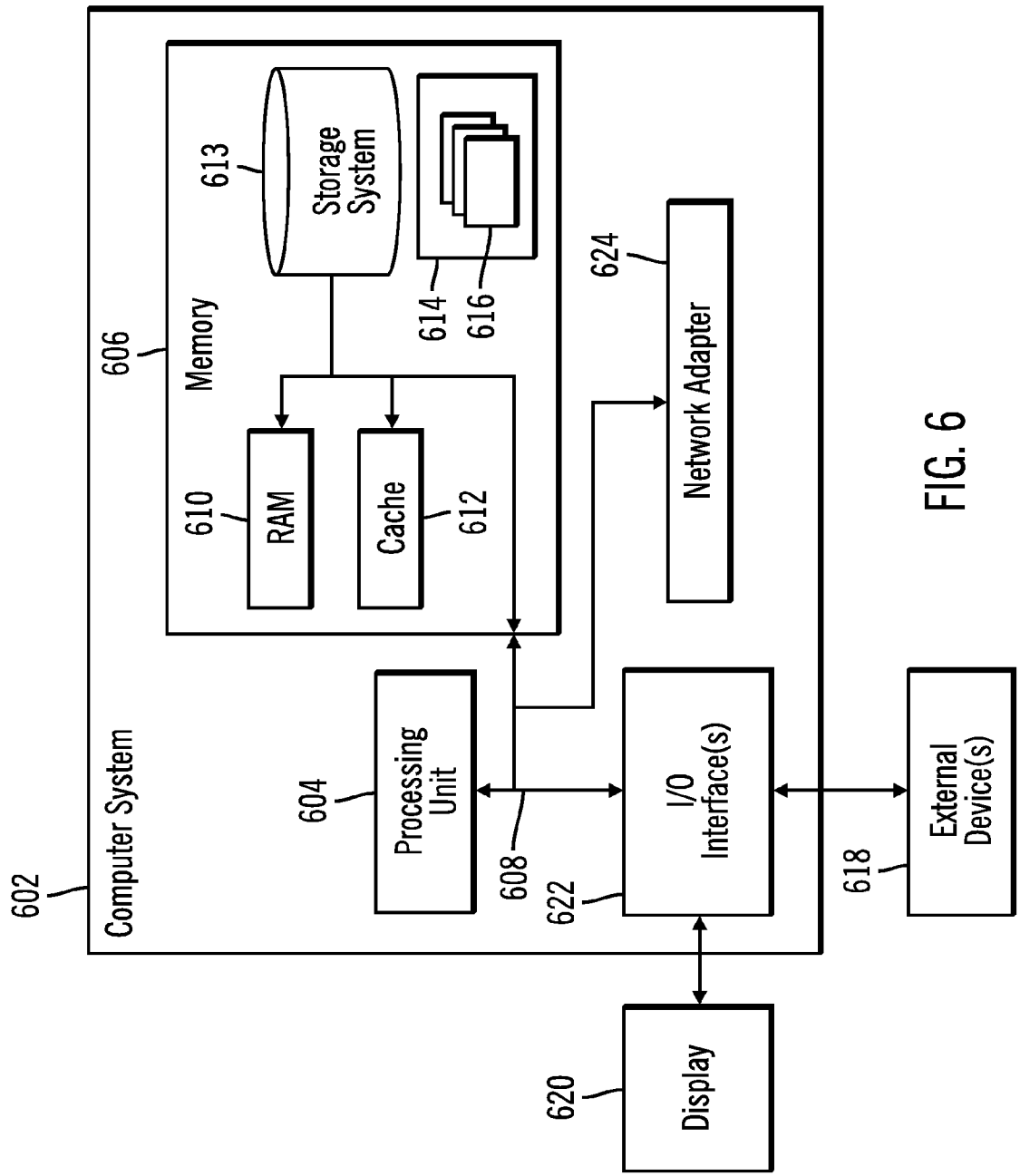
FIG. 6 illustrates an embodiment of a computer architecture used with described embodiments.

The computational components of FIG. 1, including the servers 100a, 100b, and hosts 104 may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1 may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for redirecting host access from a first server to a second server, wherein the first server manages access to a first storage and the second server manages access to a second storage, the computer program product comprising a computer readable storage medium having computer readable program code embodied therein that is executable to perform operations, the operations comprising:
  performing a swap operation to redirect host Input/Output (I/O) requests to data from the first server to the second server in response to a health condition at the first server, wherein after the swap operation, the host I/O requests are directed to the second server;
  determining that the first server is available for data mirroring operations;
  determining data errors with respect to data in the first storage related to the health condition that resulted in the swap operation, wherein the data in the first storage having the data errors is indicated as pinned data as a result of modified data in a cache of the first server becoming lost or corrupted;
  instructing the second server to mirror data from the second storage to the first server to cause the first server to overwrite the pinned data having the data errors in the first storage with valid data in response to determining that the first server is available for the data mirroring operations; and
  indicating the data in the first storage, that was indicated as pinned, as unpinned in response to the data mirroring operations overwriting the pinned data in the first storage, having the data errors, with data mirrored from the second storage.

2. The computer program product of claim 1, wherein the operations further comprise:
  updating a first data structure indicating modified data in the first storage to indicate the data experiencing the data errors as modified; and
  merging the first data structure with a second data structure indicating modified data in the second storage to mirror to the first storage, wherein the second data structure following the merging indicates to mirror from the second storage the data in the first storage that experienced the data errors.

3. The computer program product of claim 1, wherein the operations further comprise:
  updating a data structure indicating modified data in the second storage to indicate the data experiencing the data errors as modified, wherein the second server mirrors data indicated in the data structure as modified from the second storage to the first server.

4. The computer program product of claim 1, wherein the operations further comprise:
  determining the health condition with respect to the first server that triggers the swap operation, wherein the swap operation is performed in response to determining the health condition; and
  determining that the health condition is resolved, wherein the first server is determined to be available for data mirroring operations in response to determining that the health condition is resolved, wherein at a point when the health condition is determined to be resolved, the data errors remaining at the first storage are overwritten with the valid data when the second server mirrors the data.

5. The computer program product of claim 4, wherein the health condition comprises an initial health condition, and wherein the operations further comprise:
  determining at least one additional health condition with respect to the first server following the swap operation and before the second server is instructed to mirror the data to the first server; and
  determining that the initial health condition and the at least one additional health condition are resolved while the data errors in the first storage remain, wherein the second server is instructed to mirror the data, including the data that experienced the data errors, in response to determining that the initial health condition and the at least one additional health condition are determined to be resolved while the data errors in the first storage remain.

6. The computer program product of claim 5, wherein the operations further comprise:
  indicating the initial health condition and the at least one additional health condition as unresolved in response to determining the initial and the at least one additional health conditions; and
  indicating each of the initial and the at least one additional health condition as resolved in response to determining that one of the initial and the at least one additional health condition is resolved, wherein the data errors remain after the initial and the at least one additional health condition are resolved.

7. The computer program product of claim 1, wherein the health condition indicates one of a plurality of severity levels, wherein at least one of the severity levels triggers the swap operation, wherein the at least one of the severity levels that triggers the swap operation indicates a health condition whose recovery time will exceed a time to perform the swap operation.

8. A system for redirecting host access from a first server to a second server, wherein the first server manages access to a first storage and the second server manages access to a second storage, comprising:
  processing; and
  a computer readable storage medium having computer readable program code embodied that when executed performs operations, the operations comprising:
    performing a swap operation to redirect host Input/Output (I/O) requests to data from the first server to the second server in response to a health condition at the first server, wherein after the swap operation, the host I/O requests are directed to the second server;
    determining that the first server is available for data mirroring operations;
    determining data errors with respect to data in the first storage related to the health condition that resulted in the swap operation, wherein the data in the first storage having the data errors is indicated as pinned data as a result of modified data in a cache of the first server becoming lost or corrupted;
    instructing the second server to mirror data from the second storage to the first server to cause the first server to overwrite the pinned data having the data errors in the first storage with valid data in response to determining that the first server is available for the data mirroring operations; and
    indicating the data in the first storage, that was indicated as pinned, as unpinned in response to the data mirroring operations overwriting the pinned data in the first storage, having the data errors, with data mirrored from the second storage.

9. The system of claim 8, wherein the operations further comprise:
  updating a first data structure indicating modified data in the first storage to indicate the data experiencing the data errors as modified; and
  merging the first data structure with a second data structure indicating modified data in the second storage to mirror to the first storage, wherein the second data structure following the merging indicates to mirror from the second storage the data in the first storage that experienced the data errors.

10. The system of claim 8, wherein the operations further comprise:
  updating a data structure indicating modified data in the second storage to indicate the data experiencing the data errors as modified, wherein the second server mirrors data indicated in the data structure as modified from the second storage to the first server.

11. The system of claim 8, wherein the operations further comprise:
  determining the health condition with respect to the first server that triggers the swap operation, wherein the swap operation is performed in response to determining the health condition; and
  determining that the health condition is resolved, wherein the first server is determined to be available for data mirroring operations in response to determining that the health condition is resolved, wherein at a point when the health condition is determined to be resolved, the data errors remaining at the first storage are overwritten with the valid data when the second server mirrors the data.

12. The system of claim 11, wherein the health condition comprises an initial health condition, and wherein the operations further comprise:

determining at least one additional health condition with respect to the first server following the swap operation and before the second server is instructed to mirror the data to the first server; and determining that the initial health condition and the at least one additional health condition are resolved while the data errors in the first storage remain, wherein the second server is instructed to mirror the data, including the data that experienced the data errors, in response to determining that the initial health condition and the at least one additional health condition are determined to be resolved while the data errors in the first storage remain.

13. The system of claim 8, wherein the health condition indicates one of a plurality of severity levels, wherein at least one of the severity levels triggers the swap operation, wherein the at least one of the severity levels that triggers the swap operation indicates a health condition whose recovery time will exceed a time to perform the swap operation.

14. A method for redirecting host access from a first server to a second server, wherein the first server manages access to a first storage and the second server manages access to a second storage, comprising:

performing a swap operation to redirect host Input/Output (I/O) requests to data from the first server to the second server in response to a health condition at the first server, wherein after the swap operation, the host I/O requests are directed to the second server;

determining that the first server is available for data mirroring operations;

determining data errors with respect to data in the first storage related to the health condition that resulted in the swap operation, wherein the data in the first storage having the data errors is indicated as pinned data as a result of modified data in a cache of the first server becoming lost or corrupted;

instructing the second server to mirror data from the second storage to the first server to cause the first server to overwrite the pinned data having the data errors in the first storage with valid data in response to determining that the first server is available for the data mirroring operations; and indicating the data in the first storage, that was indicated as pinned, as unpinned in response to the data mirroring operations overwriting the pinned data in the first storage, having the data errors, with data mirrored from the second storage.

15. The method of claim 14, further comprising:

updating a first data structure indicating modified data in the first storage to indicate the data experiencing the data errors as modified; and merging the first data structure with a second data structure indicating modified data in the second storage to mirror to the first storage, wherein the second data structure following the merging indicates to mirror from the second storage the data in the first storage that experienced the data errors.

16. The method of claim 14, further comprising:

updating a data structure indicating modified data in the second storage to indicate the data experiencing the data errors as modified, wherein the second server mirrors data indicated in the data structure as modified from the second storage to the first server.

17. The method of claim 14, further comprising:

determining the health condition with respect to the first server that triggers the swap operation, wherein the swap operation is performed in response to determining the health condition; and determining that the health condition is resolved, wherein the first server is determined to be available for data mirroring operations in response to determining that the health condition is resolved, wherein at a point when the health condition is determined to be resolved, the data errors remaining at the first storage are overwritten with the valid data when the second server mirrors the data.

18. The method of claim 17, wherein the health condition comprises an initial health condition, further comprising:

determining at least one additional health condition with respect to the first server following the swap operation and before the second server is instructed to mirror the data to the first server; and determining that the initial health condition and the at least one additional health condition are resolved while the data errors in the first storage remain, wherein the second server is instructed to mirror the data, including the data that experienced the data errors, in response to determining that the initial health condition and the at least one additional health condition are determined to be resolved while the data errors in the first storage remain.

19. The method of claim 14, wherein the health condition indicates one of a plurality of severity levels, wherein at least one of the severity levels triggers the swap operation, wherein the at least one of the severity levels that triggers the swap operation indicates a health condition whose recovery time will exceed a time to perform the swap operation.

* * * * *